(12) United States Patent
Lyon et al.

(10) Patent No.: US 7,045,996 B2
(45) Date of Patent: May 16, 2006

(54) POSITION DETERMINATION BASED ON PHASE DIFFERENCE

(75) Inventors: Geoff M. Lyon, Menlo Park, CA (US); Salil Pradhan, Santa Clara, CA (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 10/354,112

(22) Filed: Jan. 30, 2003

(65) Prior Publication Data

US 2004/0150387 A1    Aug. 5, 2004

(51) Int. Cl.
*G01B 7/14* (2006.01)
*G01B 7/30* (2006.01)
*H01F 5/00* (2006.01)

(52) U.S. Cl. .................. 324/207.16; 324/207.15; 324/207.11; 340/825.49; 340/10.1

(58) Field of Classification Search .......... 324/207.16, 324/207.18, 233, 236, 207.15, 207.11, 207.12; 342/42, 46, 464, 450; 257/100; 336/115; 340/10.1, 10.2, 10.3, 10.4, 10.5, 10.6, 539.23, 340/572.6, 825.49

See application file for complete search history.

(56) References Cited

U.S. PATENT DOCUMENTS

| | | | |
|---|---|---|---|
| 4,679,046 A * | 7/1987 | Curtis et al. | 342/51 |
| 5,594,448 A * | 1/1997 | d'Hont | 342/44 |
| 5,793,202 A * | 8/1998 | Ikemoto | 324/207.17 |
| 5,963,134 A * | 10/1999 | Bowers et al. | 340/572.1 |
| 6,043,644 A * | 3/2000 | de Coulon et al. | 324/207.18 |
| 6,046,683 A * | 4/2000 | Pidwerbetsky et al. | 340/10.4 |
| 6,600,443 B1 * | 7/2003 | Landt | 342/42 |
| 6,661,335 B1 * | 12/2003 | Seal | 340/10.1 |
| 6,717,516 B1 * | 4/2004 | Bridgelall | 340/572.1 |
| 2001/0001430 A1 * | 5/2001 | Ely et al. | 178/18.03 |
| 2003/0030568 A1 * | 2/2003 | Lastinger et al. | 340/825.49 |
| 2003/0046339 A1 * | 3/2003 | Ip | 709/203 |

* cited by examiner

*Primary Examiner*—Bot Ledynh
*Assistant Examiner*—Kenneth J. Whittington

(57) ABSTRACT

A method for determining position of a device includes generating at least two, time-varying, magnetic fields using inductive elements, wherein the fields have differing phases. The method further includes detecting a signal modulated on top of the fields, wherein the signal is generated from the device, and determining a position of the device based on a phase difference of the signal from the device and a reference signal.

23 Claims, 8 Drawing Sheets

400

```
┌─────────────────────────┐
│ GENERATE PHASE-DIFFERING│
│    MAGNETIC FIELDS      │
│                    410  │
└─────────────────────────┘
            │
            ▼
┌─────────────────────────┐
│   DETECT SIGNAL FROM TAG│
│                    420  │
└─────────────────────────┘
            │
            ▼
┌─────────────────────────┐
│ DETERMINE POSITION BASED│
│   ON PHASE DIFFERENCE   │
│    OF THE SIGNAL AND A  │
│    REFERENCE SIGNAL     │
│                    430  │
└─────────────────────────┘
```

*FIG. 4*

POSITION DETERMINATION BASED ON PHASE DIFFERENCE

FIELD OF THE INVENTION

The invention pertains to position determination. More particularly, this invention relates to determining position based on a phase difference.

BACKGROUND OF THE INVENTION

Various systems use transponders to identify objects from a distance by associating a transponder with the object. The transponders, also known as radio frequency identification (RFID) tags, are typically programmed with unique identification codes that identify the object. FIG. 5 illustrates a conventional tag and reader system. A reader 510 may include an inductive element 512 generating a magnetic field that energizes a tag 520. The tag 520 may include an inductive element 522 and a load 524. When the tag 520 is in proximity of the reader 510, the magnetic field generated by the reader 510 energizes the tag 520 by inducing a voltage across the inductive element 522.

The tag 520 may transmit limited information back to the reader 510, such as an identification code. For example, a load 524 shunted across the inductive element 522 when the tag 520 is energized causes the magnetic coupling between the reader 510 and the tag 520 to change. The change in the magnetic coupling results in voltage fluctuations across the inductive element 512 of the reader 510, which when demodulated identifies the information exchanged between the tag 520 and the reader 510.

Readers and tags, such as shown in FIG. 5, are used for a number of applications. However, these applications are usually limited to remote identification applications.

SUMMARY OF THE INVENTION

According to an embodiment of the invention, a method for determining position of a device comprises generating at least two, time-varying, magnetic fields using inductive elements, wherein the at least two fields have differing phases; detecting a signal modulated on the at least two fields, the signal being from the device; and determining a position of the device based on a phase difference of the signal from the device and a reference signal.

According to another embodiment of the invention, an apparatus for detecting position of a device comprises an oscillator and driver circuit; a first inductive element energized by the oscillator and driver circuit to generate a first time-varying magnetic field at a first phase; a second inductive element energized by the oscillator and driver circuit to generate a second time-varying magnetic field at a second phase; circuitry associated with detecting and demodulating a signal from the device modulated on the first and second magnetic field; and processing circuitry determining a position of the device based on a phase difference between the signal and a reference signal.

According to yet another embodiment of the invention, a system for detecting a position of a tag comprises at least one reader including inductive elements for generating at least two, time-varying, magnetic fields, wherein the at least two fields have differing phases; and at least one tag including an inductive element for coupling a magnetic field, the coupled magnetic field having components of the at least two, time-varying, magnetic fields. The tag is operable to modulate a signal on the magnetic field, wherein the signal has a phase approximately equal to the coupled magnetic field. Also, the at least one reader is operable to receive the modulated signal and determine a position of the tag based on a phase difference between the signal and a reference signal.

According to yet another embodiment of the invention, an apparatus for determining position of a device comprises means for generating at least two, time-varying, magnetic fields using inductive elements, wherein the at least two fields have differing phases; means for detecting a signal modulated on the at least two fields, the signal being from the device; and means for determining a position of the device based on a phase difference of the signal from the device and a reference signal.

According to yet another embodiment of the invention, a system comprises at least one electronic device housed in a rack; a tag connected to the at least one electronic device; and at least one reader operable to interrogate the tag to determine a position of the tag in the rack.

BRIEF DESCRIPTION OF THE DRAWINGS

The present invention is illustrated by way of example and not limitation in the accompanying figures in which like numeral references refer to like elements, and wherein:

FIG. 4 illustrates a flow diagram of a method for determining position of a device, according to an embodiment of the invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
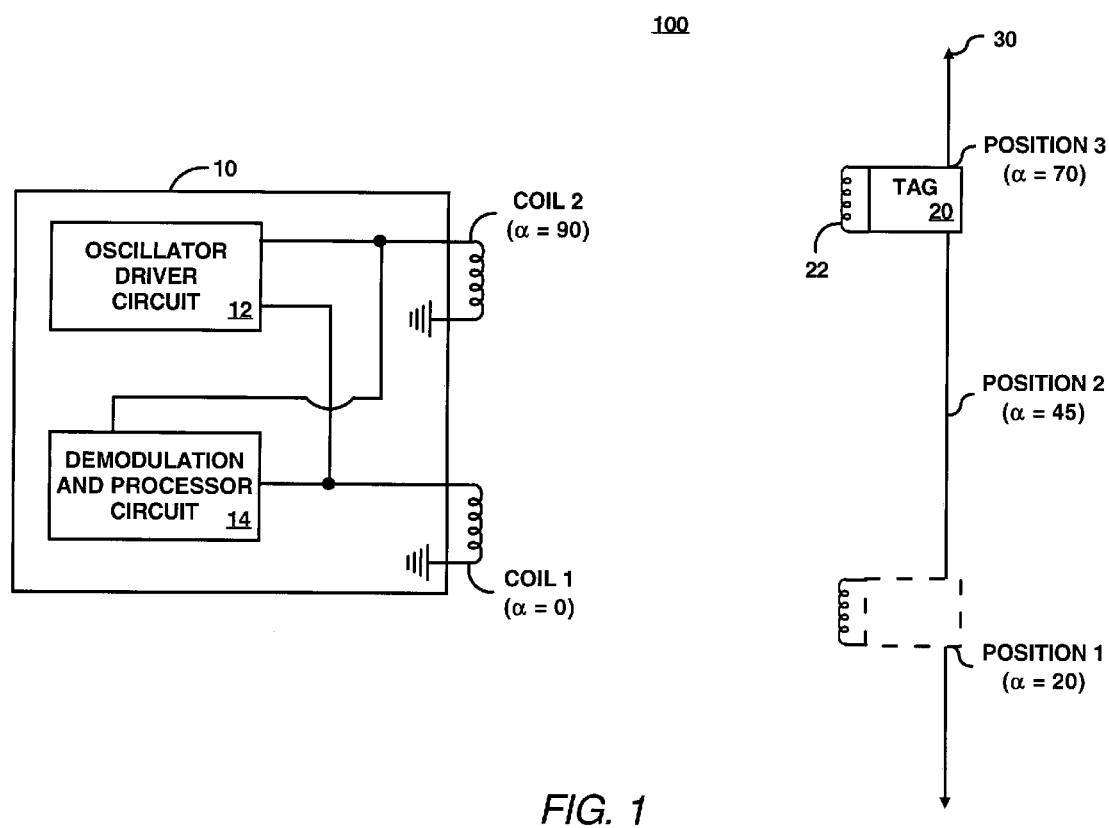
FIG. 1 illustrates a position detection system, according to an embodiment of the invention.

FIG. 1 illustrates a reader 10 (also known as an interrogator) and a tag 20 in a position detection system 100, according to an embodiment of the invention. The reader 10 generates a magnetic field for sensing a tag (e.g., the tag 20). The magnetic field induces an energizing signal (e.g., a current induced in a coil 22 in the tag 20) for powering the tag 20. When powered, the tag 20 modulates a signal on the magnetic field, which is used by the reader 10 to determine a position of the tag 20. The position of the tag 20 may be determined by a difference in phase between a reference signal and the modulated signal.

The reader 10 includes an oscillator driver circuit 12 driving coil 1 and coil 2 for generating two, time-varying fields. These two magnetic fields have differing phases but may have the same frequency. An exemplary phase for each of the two magnetic fields (e.g., $\alpha=0$ and $\alpha=90$) is shown for purposes of illustration and not by way of limitation. Fields having other phases may be used. The magnetic fields generate a phase distribution in space, which allows a relative position of a tag 20 to be detected by the reader 10, as described in detail below. The reader 10 also includes a demodulation and processor circuit 14 for demodulating a signal from the tag 20 received via one of the coils 1 or 2. The circuit 14 also determines position of the tag 20 by comparing the phase of the demodulated signal to a reference signal. The reference signal may be one of the magnetic fields generated by the coils 1 and 2. The reference signal, however, is not limited to one of these magnetic fields and may simply be a predetermined phase value or a signal having a phase value different from the magnetic fields generated by coils 1 and 2.

It will be apparent to one of ordinary skill in the art that the circuits 12 and 14 may comprise multiple known circuits for performing the functions described above. FIG. 1 also illustrates the tag 20 in two positions for purposes of describing and illustrating a determination of the position of the tag 20. It will be apparent to one of ordinary skill in the art that the tag 20 may be located anywhere in space, and the reader 10 may determine the position of the tag 20 when the tag 20 is in proximity to the reader 10. Also, a phase for a detected magnetic filed at each of the positions 1–3 for the tag 20 is shown for purposes of illustration and not by way of limitation. These phase values are dependent on the magnetic fields generated by the coils 1 and 2.

Figure 2A:
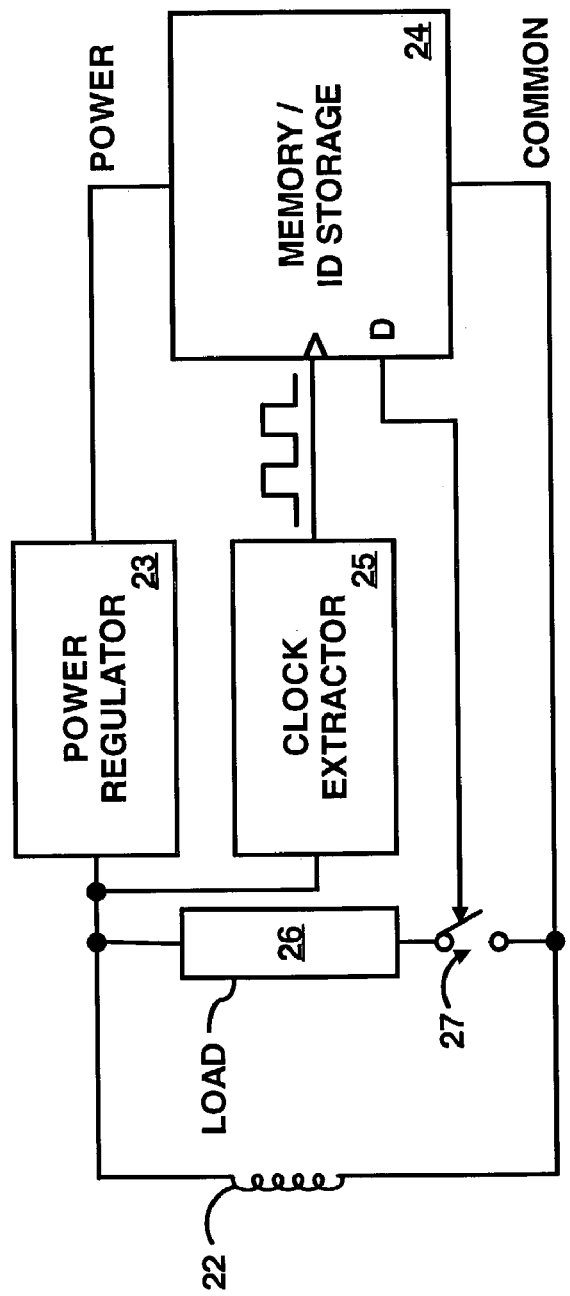
FIG. 2A illustrates a block diagram of a tag, according to an embodiment of the invention.

FIG. 2A illustrates a block diagram of the tag 20. When the tag 20 is in proximity of the reader 10, the magnetic fields generated by the coils 1 and 2 of the reader 10 produce an energizing signal in the tag 20 through the coil 22 for powering circuit components of the tag 20. For example, the magnetic fields induce a current in a coil 22 of the tag 20. The induced current is used to generate a clock signal and power for the tag 20. The tag 20 should be within a predetermined distance to the reader 10 such that the magnetic field sensed by the tag 20 is sufficient to induce a current for powering the tag 20.

Figure 2B:
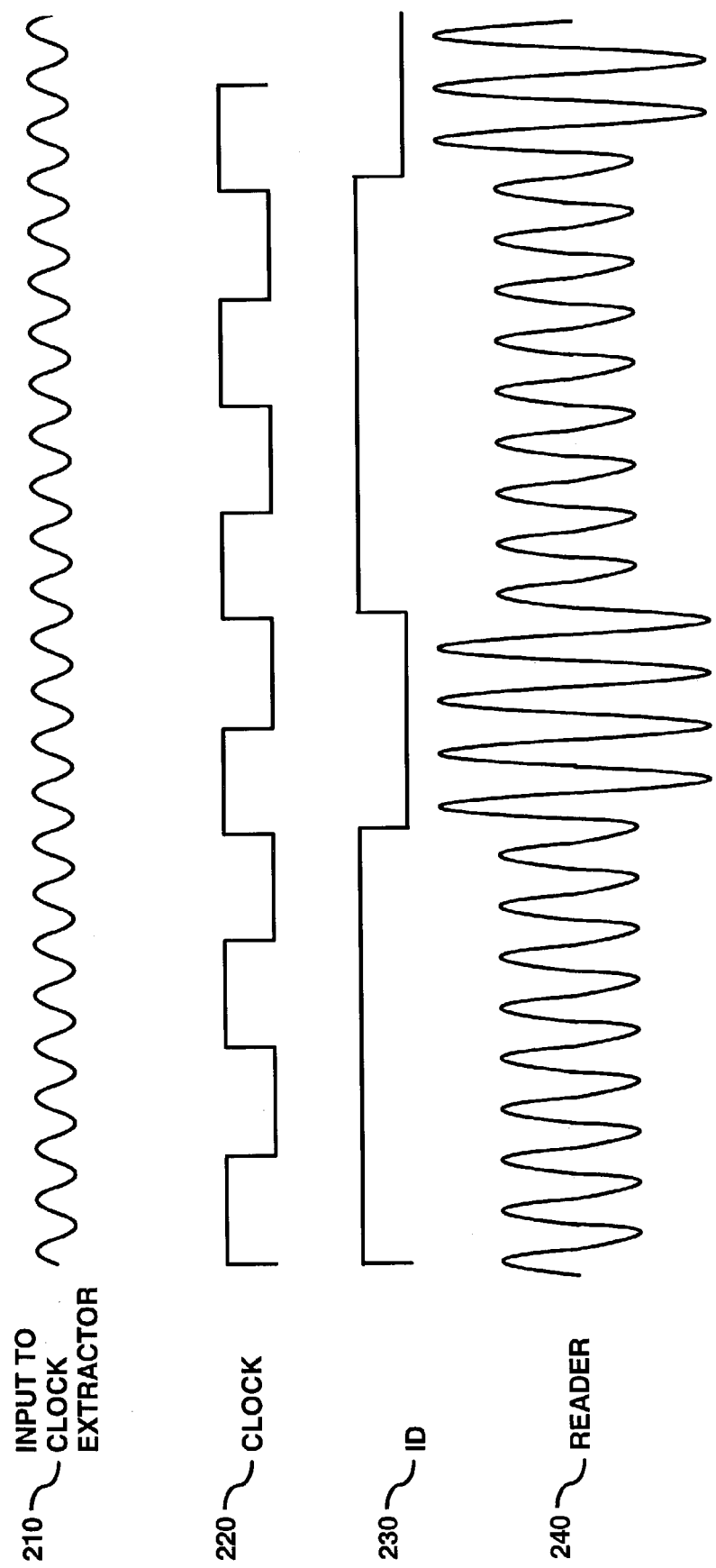
FIG. 2B illustrates signals generated by a tag, according to an embodiment of the invention.

When a current is induced in the coil 22, a clock signal is derived by a clock extractor 25 and input to the memory 24. FIG. 2B illustrates an energizing signal 210 generated by the coil 22 when in proximity to the reader 10. The signal 210 is input to the clock extractor 25, and a clock signal 220 (shown in FIG. 2B) is derived by the clock extractor 25. In the example shown in FIG. 2B, the extractor 25 divides the signal 210 approximately by four to generate the clock signal 220, however extractions other than four may be used. The clock signal 220 has approximately the same phase as the signal 210. The signal 210 is also used to energize the memory 24 via the power regulator 23. For example, the power regulator 23 may include a rectifier (not shown) for outputting a current that may be used to power the memory 24.

The clock signal 220 is used to drive the memory 24 for outputting a bitstream (e.g., ID signal 230 of FIG. 2B) at approximately the same phase. The signal 230 drives a switch 27 to close, causing a load 26 to be shunted across the coil 22. Using the coil 22 a signal (e.g., signal 240 of FIG. 2B) having approximately the same phase as the magnetic field detected by the coil 22 of the tag 20 (e.g., the magnetic field including components of the magnetic fields generated by coils 1 and 2 of the reader 10) is modulated on the magnetic field for detection by the reader 10. The signal 240 of FIG. 2B, for example, is the signal received by the reader 10. The signal 230 provides the envelope signal for modulating the signal 240. The reader 10 determines a phase difference between the signal 240 and a reference signal to determine the position of the tag 20.

The magnetic field generated by the reader 10 for inducing an energizing signal in the tag 20 includes two components. The components include time-varying, sinusoidal, magnetic fields generated by coil 1 and coil 2 of the reader 10. The fields are at the same frequency, but have differing phases and can be represented as follows:

| | |
|---|---|
| Coil 1 field | $a\sin(\omega t)$; and |
| Coil 2 field | $b\cos(\omega t)$. |

The resultant, energizing, magnetic field at the tag location is a summation of the two fields, which is a sinusoidal waveform at the same frequency but with position dependent amplitude and phase. The resultant magnetic field at the tag 20 can be represented as follows:

$a\sin(\omega t)+b\cos(\omega t)=r\cos(\omega t-\alpha)$ is the resultant magnetic field; wherein $r=\text{sqrt}(a^2+b^2)$ is the amplitude;

$\alpha=\arctan(b/a)$ is the phase; and a and b are the field strengths of the magnetic fields generated by the coils 1 and 2 respectively at the tag 20.

Changes in the amplitude of the resultant magnetic field may not be used to determine position, but must be sufficient to energize the tag 20. Changes in the phase $\alpha$ are used to determine position of the tag 20.

Referring to FIG. 1, as the tag 20 moves along the axis 30, the phase $\alpha$ of the magnetic field received by the tag 20 varies. At points in space equidistant from the coils 1 and 2, such as the point at position 2, the components of the magnetic field are equal. Therefore, the phase $\alpha$ is 45 degrees at position 2 when the components of the magnetic field generated by coils 1 and 2 of the reader 10 have a phase difference of 90 degrees (e.g., $a\sin(\omega t)$ and $b\cos(\omega t)$). As the tag 20 moves closer to coil 1, the phase $\alpha$ decreases towards zero. For example, at position 1, the phase $\alpha$ is approximately 20 degrees. As the tag 20 moves closer to coil 2, the phase $\alpha$ increases towards 90 degrees. For example, at position 3 the phase $\alpha$ is approximately 70 degrees. It will be apparent to one of ordinary skill in the art that magnetic fields may be generated by the reader 10 that have a phase difference of other than 90 degrees without departing from the spirit and scope of the invention.

A phase difference between the magnetic field received at the tag 20 and a reference signal may be used to determine a position of the tag 20. If the phase $\alpha$ of the magnetic field detected at the tag 20 is known at predetermined location(s), then a relative location may be determined for the tag 20 by using phase difference.

For determining position, the phase difference distribution can be pre-determined using a number of well known techniques, for example, by solving the magnetic field equations for the area of interest (usually a $2^{nd}$ order differential problem with known or assumed boundary constraints), by computer simulation (typically using finite element electromagnetic simulation software) or by practical measurement at the expected tag locations. Once this phase difference distribution is known, the phase response of the tag 20 can be related to the position of the tag 20 along, for example, the axis 30 of FIG. 1. For example, at positions 1, 2 and 3 in FIG. 1, the phase differences are known to be 20, 45 and 70 degrees, respectively. When the tag 20 is interrogated at one of these positions, the phase response closely matches these expected values. Note that the signal (e.g., signal 240 of FIG. 2B) modulated from the tag 20 has substantially the same phase α as the magnetic field detected at the tag 20. Therefore, the reader 10 can demodulate the signal 240 and calculate the phase difference using the demodulation and processor circuit 14.

FIG. 1 illustrates a single reader and a single tag. It will be apparent to one of ordinary skill in the art that the reader 10 may be used to detect positions of multiple tags in the system 100. Also, multiple readers may be used in the system 100. In addition, FIG. 1 generally illustrates detecting tag positions along one axis of movement, such as the axis 30. This axis may correspond to position in a dimension along the axis. It will be apparent to one of ordinary skill in the art that multiple readers may be used to determine position, substantially, at any location in a space that is proximate to a reader. Furthermore, some applications may only need to detect movement along a known axis. For these types of applications, a reader may be oriented to detect movement along the desired axis.

Figure 3A:
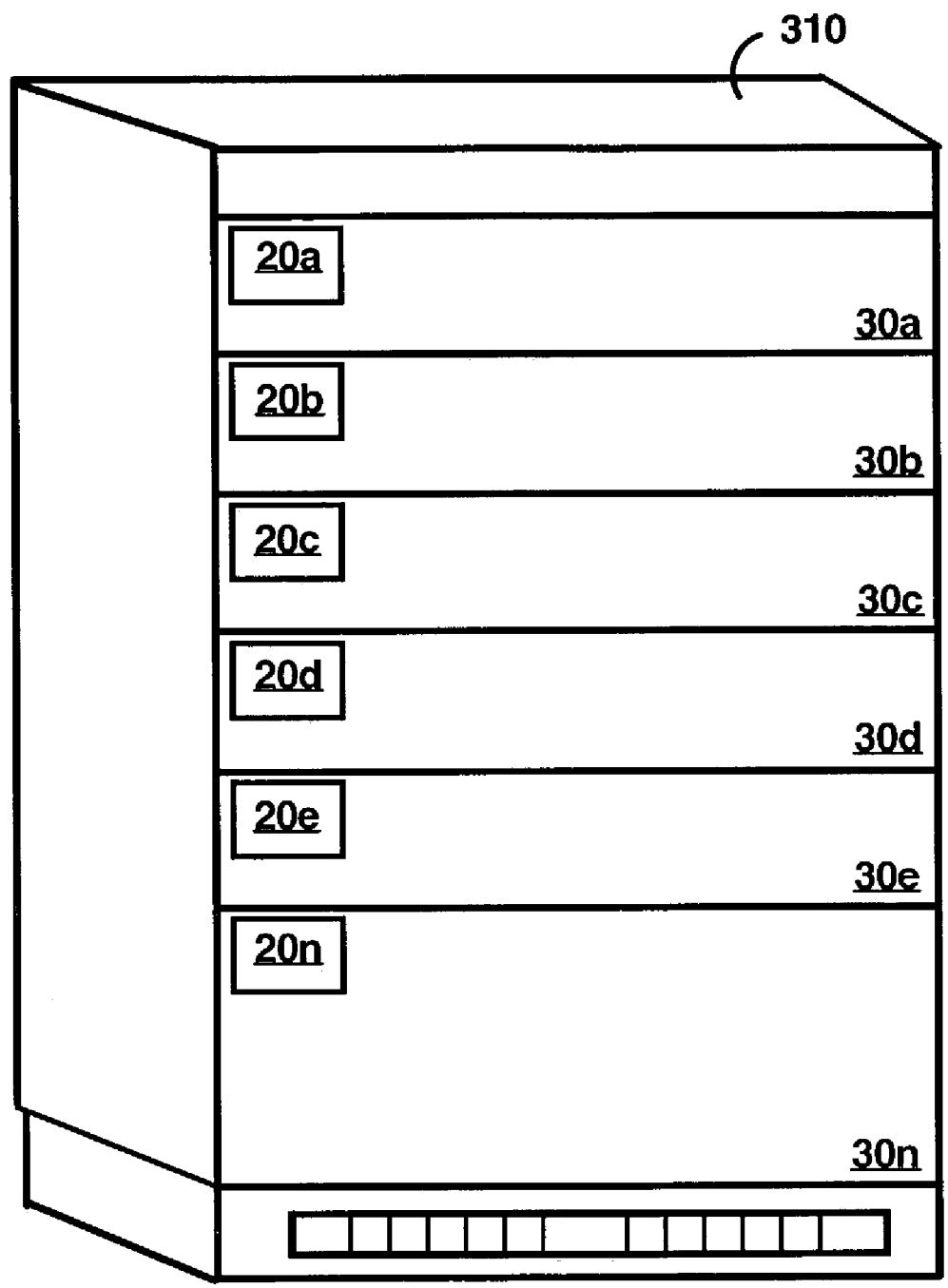
FIG. 3A illustrates a rack, according to an embodiment of the invention.

According to an embodiment of the invention, the system 100 of FIG. 1 may be used to determine position of one or more electronic devices 30a . . . n housed in one or more racks in a data center. FIG. 3A illustrates a rack 310, which may be used in a data center (not shown) for housing electronic devices 30a . . . n. The rack 310 may be a rack unit, as is known in the art, for housing multiple electronic devices. The rack 310, for example, may include a standard 42 unit rack, 46 unit rack, etc. The rack 310 includes shelves (not shown) supporting the electronic devices 30a–n. The electronic devices 30a–f may be network devices or devices used with network devices (e.g., servers (also referred to as blades), routers, hubs, monitors, power supplies, etc.). The tags 20a–n are connected to corresponding electronic devices 30a–f. Position may be determined for each electronic device 30a . . . n using, for example, the system 100 of FIG. 1.

Figure 3B:
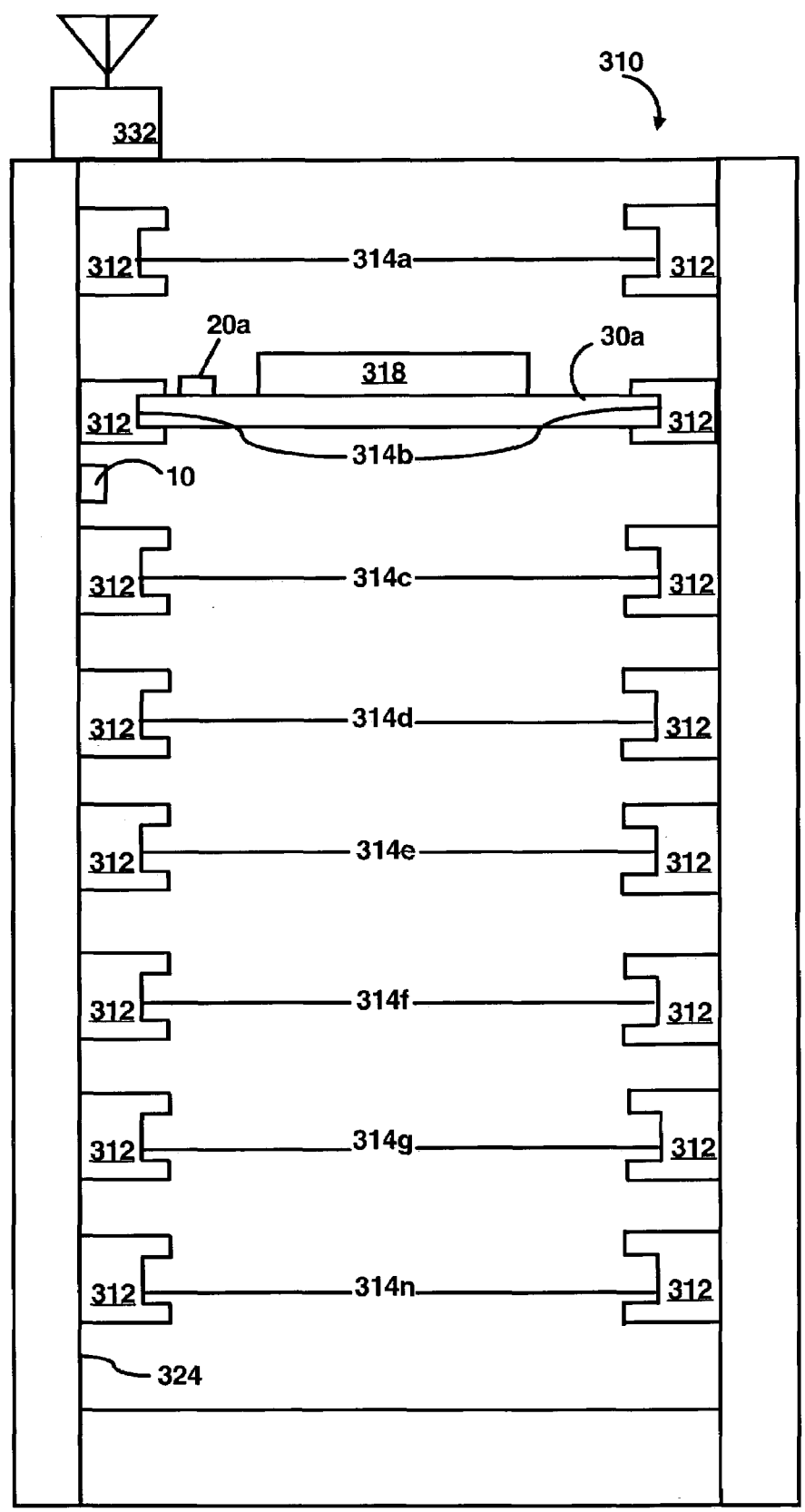
FIG. 3B illustrates detecting position of an electronic device mounted in a first location of the rack of FIG. 3A, according to an embodiment of the invention.

FIG. 3B illustrates a position detection system used with the rack 310 for detecting a position of an electronic device (e.g., electronic device 30a) in the rack 310. The rack 310 includes opposed pairs of mounts 312 that define open bays 314a–n into which electronic devices 30a . . . n are located. The term "rack" includes any doors, lids, or other accessories associated with the rack (not shown). One of ordinary skill in the art will recognize that the mounts 312 and bays 314a–n merely exemplify one of any number of mounting means that are used with rack apparatus. Furthermore, the term "bay" is synonymous with slot, opening, location, position, and the like. The rack 310 may house any number of electronic devices which may be modules, server boards, routers, hubs, monitors, power supplies, and the like, e.g., about forty (40) to eighty (80) devices. The electronic devices typically include a number of components and/or attachments 318, e.g., processors, micro-controllers, high speed video cards, memories, semi-conductor devices, and the like.

A reader 10 is shown mounted proximate to the bays 314b and 314c. The electronic device 30a is shown as mounted in bay 314b. The reader 10 interrogates the tag 20a connected to the electronic device 30a. For example, the reader 10 generates a magnetic field using two coils (e.g., the coil 1 and the coil 2 of the reader 10 shown in FIG. 1). The magnetic field induces an energizing signal for powering the tag 20a. When powered, the tag 20a modulates a signal on the magnetic field, which is used by the reader 10 to determine a position of the tag 20a. The position of the tag 20a may be determined by a difference in phase between a reference signal and the signal modulated from the tag 20a to the reader 10.

The position detected by the reader 10 is substantially a position along a vertical axis of the rack 310, such as an axis that is parallel to the side wall 324 of the rack 310. Therefore, if the electronic device 30a is mounted in another bay of the rack 310, the reader 10 determines a different position for the electronic device 30a.

Figure 3C:
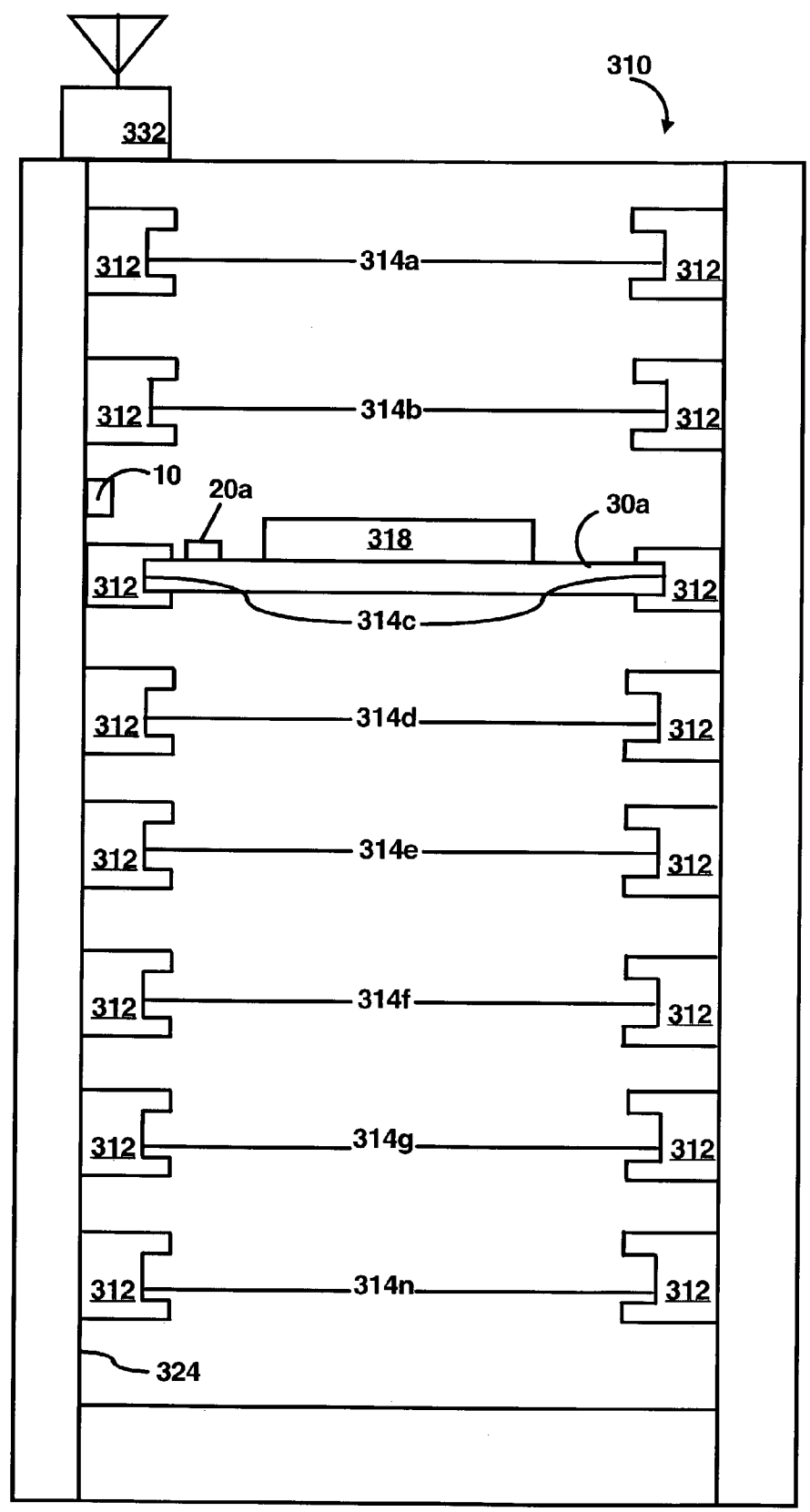
FIG. 3C illustrates detecting position of an electronic device mounted in a second location of the rack of FIG. 3A, according to an embodiment of the invention.
Figure 5:
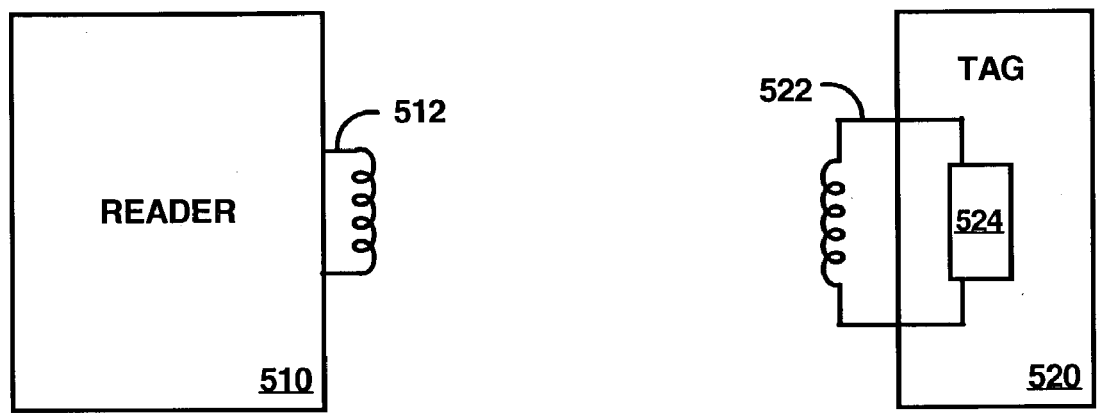
FIG. 5 illustrates a conventional reader and tag.

FIG. 3C illustrates the electronic device 30a mounted in the bay 314c of the rack 310. As similarly described with respect to FIG. 3A and FIG. 1, the reader 10 generates a magnetic field which induces an energizing signal for powering the tag 20a. When powered, the tag 20a modulates a signal on the magnetic field, which is used by the reader 10 to determine a position of the tag 20a. The position of the tag 20 may be determined by a difference in phase between a reference signal and the signal modulated from the tag 20a to the reader 10.

In FIG. 3C, the phase difference between the signal received from the tag 20a and the reference signal is different from the phase difference between the signal received from the tag 20a (shown in FIG. 3B) and the reference signal. Each phase difference corresponds to a different position, such as shown in FIG. 1. Using this technique, one or more readers may be used to determine position of one or more electronic devices mounted in the rack 310.

The tag 20a is shown as mounted onto a right front portion of a corresponding electronic device 30a, but the tag 20a can be mounted to, printed on, or encapsulated within the electronic device 30a. As shown, the reader 10 is mounted to a front portion of a left inside wall 324 of the rack 310. One of ordinary skill in the art will recognize that the reader 10 may be mounted to the rack 310 in any reasonable manner including any of a variety of fastening devices including tie straps, hook and loop material, screws, mounting brackets, and the like (not shown). The reader 10 and tag 20a may be mounted in any corresponding locations, positions, or orientations on the rack 310 to ensure that the tag 20a may be read by the reader 10. For example, the reader 10 may alternatively be mounted to a rear portion of the inside wall 324 of the rack 310, to a door (not shown) of the rack 310, on the mounts 312, and the like.

As shown in FIGS. 3B and 3C, the reader 10 may be connected to a node 332, which may include a computing device with a transceiver for communicating with other nodes. The node 332 may receive information from the reader 10, such as position of the tag 20a, an identification code from the tag 20a, etc. The node 332 may associate position and identification code from the tag 20a. Furthermore, the electronic device 30a may be identified by the identification signal transmitted from the tag 20a. Therefore, the node 332 may store position for the electronic device 30a.

Typically, the rack 310 may house multiple electronic devices, such as shown in FIG. 3A, and one or more readers may be used to determine the position of each electronic device. Furthermore, the one or more readers may be connected to the node 332, such that the node 332 may store the position of each electronic device. The node 332 may communicate position for the electronic devices to other nodes (not shown) connected to, for example, other respective data racks or nodes that are stand-alone.

FIG. 4 illustrates a method 400 for determining position of the tag, according to an embodiment of the invention. In step 410, the reader 10 generates two, time-varying, magnetic fields using the coils 1 and 2. The magnetic fields have different phases and may have the same frequency. In step 420, the reader 10 detects a signal from the tag 20 which is modulated on top of the at least two fields. For example, one of the coils 1 and 2 receives the signal from the tag 20. The demodulation and processor circuit 14 demodulates the signal and determines a position of the device based on a phase difference of the signal from the device and one of the at least two magnetic fields used as a reference signal (step 430).

The method 400 is an exemplary embodiment, and it will be apparent to one of ordinary skill in the art that the method is subject to many alternatives, modifications and variations without departing from the spirit and scope of the invention.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for determining position of a device comprising steps of:
   generating at least two, time-varying, magnetic fields using inductive elements, wherein the at least two fields have differing phases;
   detecting a signal, wherein the signal includes data from the device that is modulated on the at least two fields; and
   determining a position of the device based on a phase difference of the signal from the device and a reference signal.

2. The method of claim 1, wherein the step of determining a position further comprises determining a position in a single dimension.

3. The method of claim 1, wherein the inductive elements are a pair of coils, and the step of generating at least two fields comprises steps of:
   generating a first, time-varying magnetic field with one coil of the pair of coils; and simultaneously generating a second, time-varying magnetic field with a second coil of the pair of magnetic fields, the second field having a different phase from the first field.

4. The method of claim 3, wherein the first and second fields have the same frequency.

5. The method of claim 1, wherein the signal modulated on the at least two fields is a signal having approximately the same phase as a magnetic field detected by the device in proximity of the inductive elements, the magnetic field detected by the device having components of the at least two, generated, time-varying, magnetic fields.

6. The method of claim 1, wherein the device is a tag.

7. The method of claim 1, wherein the reference signal comprises one of the at least two magnetic fields.

8. An apparatus for detecting position of a device, the apparatus comprising:
   an oscillator and driver circuit;
   a first inductive element energized by the oscillator and driver circuit to generate a first time-varying magnetic field at a first phase;
   a second inductive element energized by the oscillator and driver circuit to generate a second time-varying magnetic field at a second phase;
   circuitry associated with detecting and demodulating a signal from the device, wherein the signal includes data from the device that is modulated on the first and second magnetic field; and
   processing circuitry determining a position of the device based on a phase difference between the signal and a reference signal.

9. The apparatus of claim 8, wherein the reference signal is one of the first and second time-varying magnetic fields.

10. The apparatus of claim 8, wherein the position is a position in a single dimension.

11. The apparatus of claim 8, wherein the inductive elements are a pair of coils.

12. The apparatus of claim 8, wherein the first and second time-varying fields have approximately the same frequency.

13. The apparatus of claim 8, wherein the signal from the device is a signal having the same phase as a magnetic field detected by the device in proximity of the inductive elements, the magnetic field detected by the device having components of the first and second, time-varying, magnetic fields.

14. The apparatus of claim 8, wherein the circuitry for detecting and demodulating comprises one of the first and second inductive elements.

15. A system for detecting a position of a tag, the system comprising:
   at least one reader including inductive elements for generating at least two, time-varying, magnetic fields, wherein the at least two fields have differing phases;
   at least one tag including an inductive element for coupling a magnetic field, the coupled magnetic field having components of the at least two, time-varying, magnetic fields, wherein the tag is operable to modulate a signal on the magnetic field, the signal having a phase approximately equal to the coupled magnetic field and the signal including data from the tag that is modulated on the magnetic fields wherein
   the at least one reader is operable to receive the modulated signal and determine a position of the tag based on a phase differene, between the signal and a reference signal.

16. The system of claim 15, wherein the reference signal is one of the first and second time-varying magnetic fields.

17. The system of claim 15, wherein the at least one tag comprises circuitry for generating the signal.

18. The system of claim 17, wherein the tag is in proximity of the reader such that the coupling of the magnetic field by the inductive element of the tag is such to generate sufficient energy to energize the circuitiy for generating the signal.

19. An apparatus determining position of a device comprising:
   means for generating at least two, time-varying, magnetic fields using inductive elements, wherein the at least two fields have differing phases;
   means for detecting a signal, wherein the signal includes data from the device that is modulated on top of the at least two fields; and
   means for determining a position of the device based on a phase difference of the signal from the device and a reference signal.

20. The apparatus of claim 19, wherein the reference signal comprises one of the at least two magnetic fields.

21. A system comprising:
   at least one electronic device housed in a rack;
   a tag connected to the at least one electronic device; and at least one reader operable to generate an interrogation signal for interrogating the tag using a first inductive element generating a first time-varying magnetic field at a first phase and a second inductive element generating a second time-varying magnetic field at a second phase and operable to interrogate the tag to determine a position of the tag in the rack, wherein the tag generates a signal in response to being interrogated by the at least one reader, wherein the signal includes data from the tag that is modulated on the first and second magnetic fields for transmission to the reader, and the at least one reader is operable to determine the position of the tag based on a phase difference between the signal generated by the tag and a reference signal.

22. The system of claim 21, wherein the reference signal is one of the first time-varying magnetic field and the second time-varying magnetic field.

23. The system of claim 21, wherein the position is a position along a vertical axis of the rack.

* * * * *